(12) United States Patent
Yee et al.

(10) Patent No.: US 8,396,711 B2
(45) Date of Patent: Mar. 12, 2013

(54) VOICE AUTHENTICATION SYSTEM AND METHOD

(75) Inventors: Dawson Yee, Bellevue, WA (US); Gurdeep S. Pall, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 1531 days.

(21) Appl. No.: 11/414,976

(22) Filed: May 1, 2006

(65) Prior Publication Data

US 2007/0255564 A1 Nov. 1, 2007

(51) Int. Cl.
*G10L 17/00* (2006.01)

(52) U.S. Cl. ........ 704/246; 704/249; 704/234; 704/273; 379/88.01

(58) Field of Classification Search .................. 704/246, 704/249, 234, 273; 379/88.01
See application file for complete search history.

(56) References Cited

U.S. PATENT DOCUMENTS

| | | | | |
|---|---|---|---|---|
| 5,465,290 A * | 11/1995 | Hampton et al. | ........... | 379/88.02 |
| 5,548,647 A * | 8/1996 | Naik et al. | ..................... | 704/200 |
| 5,719,921 A * | 2/1998 | Vysotsky et al. | .......... | 379/88.01 |
| 5,893,057 A * | 4/1999 | Fujimoto et al. | .............. | 704/246 |
| 5,913,192 A * | 6/1999 | Parthasarathy et al. | .... | 704/256.1 |
| 6,393,305 B1 * | 5/2002 | Ulvinen et al. | ................ | 455/563 |
| 6,401,063 B1 * | 6/2002 | Hebert et al. | .................. | 704/234 |
| 6,510,415 B1 * | 1/2003 | Talmor et al. | .................. | 704/273 |
| 6,529,871 B1 * | 3/2003 | Kanevsky et al. | ............. | 704/246 |
| 6,684,186 B2 * | 1/2004 | Beigi et al. | ..................... | 704/246 |
| 6,879,968 B1 * | 4/2005 | Hayakawa et al. | ............. | 706/20 |
| 6,931,104 B1 * | 8/2005 | Foster et al. | ................ | 379/88.02 |
| 6,973,426 B1 * | 12/2005 | Schier et al. | ................... | 704/246 |
| 2002/0087893 A1 * | 7/2002 | Shpiro et al. | ................... | 713/202 |
| 2005/0096906 A1 * | 5/2005 | Barzilay | ......................... | 704/249 |
| 2005/0131690 A1 * | 6/2005 | Creamer et al. | .............. | 704/246 |
| 2005/0180547 A1 * | 8/2005 | Pascovici | .................... | 379/88.01 |
| 2006/0020460 A1 * | 1/2006 | Itou | ................................. | 704/246 |
| 2006/0095785 A1 * | 5/2006 | White, Jr. | ....................... | 713/184 |
| 2007/0129057 A1 * | 6/2007 | Xu et al. | ........................ | 455/410 |

OTHER PUBLICATIONS

Campbell, "Speaker Recognition: A Tutorial", Proceedings of the IEEE, vol. 85, No. 9, Sep. 1997.*
Nakagawa et al., "Text-Independent Speaker Recognition by Combining Speaker-Specific GMM with Speaker Adapted Syllable-Based HMM", IEEE International Conference on Acoustics, Speech, and Signal Processing (ICASSP '04), May 2004, vol. 1, pp. I-81-4.

* cited by examiner

Primary Examiner — Jialong He

(57) ABSTRACT

A user's voice is authenticated by prompting a user to say a challenge phrase from a list of predetermined phrases and comparing the user's response with a prerecorded version of the same response. The user's stored recordings are associated with an electronic identification or serial number for a specific device, so that when communication is established using the device, only the specific user may authenticate the session. When several phrases and recordings are used, one may be selected at random for authentication so that fraudulent authentication using a recording of the user's voice may be thwarted. The system and method may be used for authenticating a device when it is first activated, such as a telephony device, or may be used when authenticating a specific communications session.

20 Claims, 3 Drawing Sheets

VOICE AUTHENTICATION SYSTEM AND METHOD

BACKGROUND

Authentication is a process by which a person's identity may be verified. Authentication is useful when a person wishes to enter into a purchase or other contractual obligation, or in other situations where the true identity of the person is demanded. Authenticating a user of an electronic device is often not as reliable as having the user appear before an agent of a transacting company and present a photo identification and execute a handwritten signature. If such authentication were reliable, it may be useful for telephony devices, computers, and other electronic devices that can communicate on a network.

In some situations, a user may be present at a retail outlet to purchase a device, but authentication becomes more complex when a device is shipped to the user's home or place of business. In this situation, the device may be easily intercepted by a third party, and the service provider may not be able to verify the user's identity. In many cases, the user may have to call the service provider on a restricted-use mode, provide some authenticating information such as a credit card number, password, or other special information, and then full service may be initiated. Other methods of authentication may use an identification card that can be read by a card reader, or a mechanical key that engages a mechanical lock. Such procedures may still be easily compromised buy a malicious third party.

Authentication may occur when a device is first activated, or may also be used at the beginning of a communication session when a high level of security is required. For example, when a monetary transaction is performed over a communications network, the user's true identity is important to combat fraud. Authentication may be performed before such a transaction is finalized.

SUMMARY

A user's voice is authenticated by prompting a user to say a challenge phrase from a list of predetermined phrases and comparing the user's response with a prerecorded version of the same response. The user's stored recordings are associated with an electronic identification or serial number for a specific device, so that when communication is established using the device, only the specific user may authenticate the session. When several phrases and recordings are used, one may be selected at random for authentication so that fraudulent authentication using a recording of the user's voice may be thwarted. The system and method may be used for authenticating a device when it is first activated, such as a telephony device, or may be used when authenticating a specific communications session.

DETAILED DESCRIPTION

Figure 1:
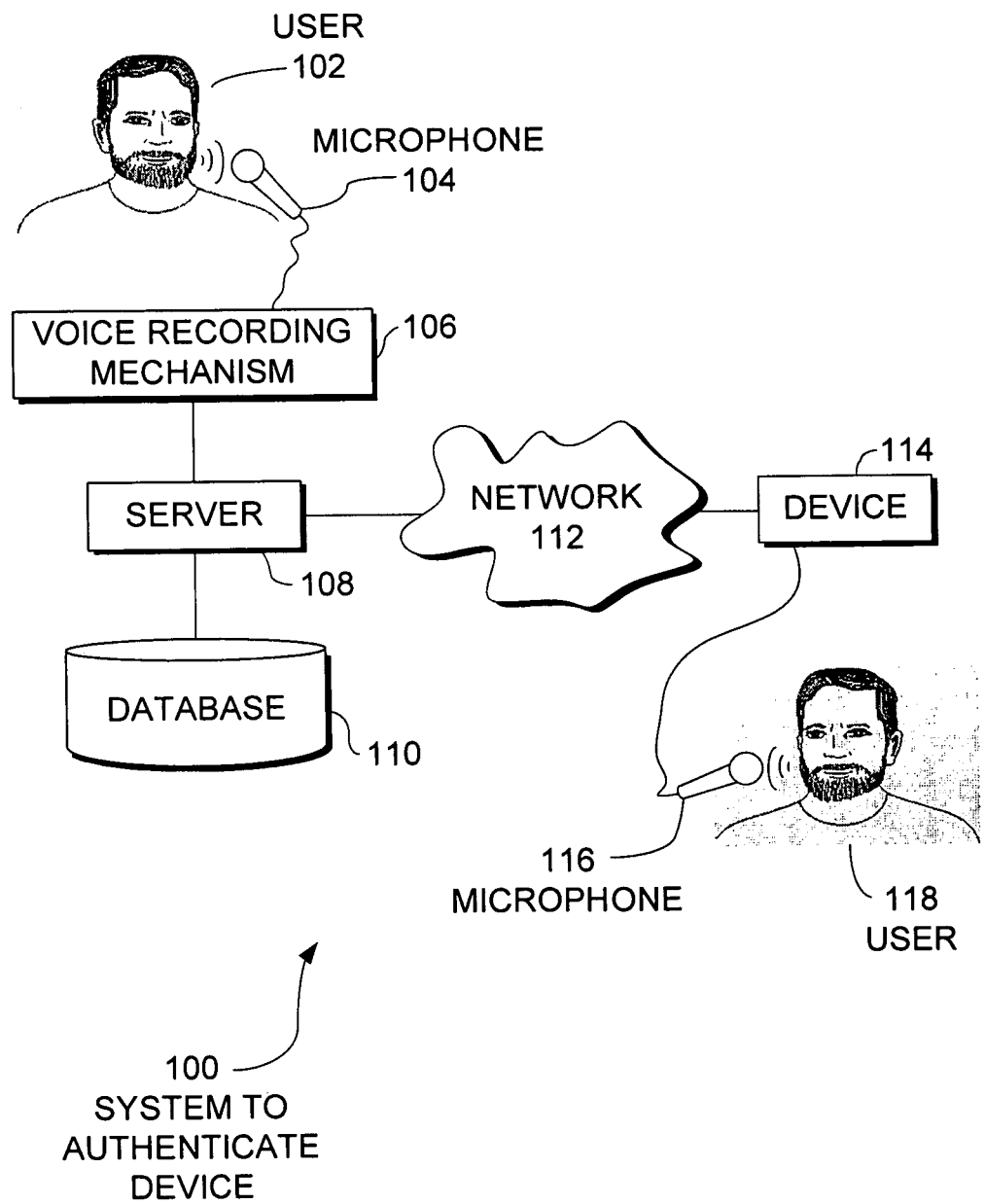
FIG. 1 is a diagrammatic illustration of an embodiment showing a system for voice authentication.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the subject matter as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a pictorial representation of an embodiment 100 showing a system to authenticate a device. A user 102 may use a microphone 104 and a voice recording mechanism 106 to store spoken phrases in a database 110. The server 108 may subsequently be connected through a network 112 to a device 114. The device 114 may have a microphone 116 through which the user 118 may speak a response to one of the prerecorded phrases in the database 110. If the response matches the prerecorded version within a specified tolerance, the server 108 may authenticate that the users 102 and 118 are the same people.

Embodiment 100 is an example of how a user's spoken words can be used as a biometric feedback to verify that the user is who they say they are. This feedback may be useful in several applications. For example, a user may authenticate a communication session as part of a secure commercial transaction. In another example, a user may authenticate the device when the user first receives the device.

The user's voice may be recorded in a setting where the user's authenticity is known, such at a retail store where a clerk may check the user's identification or by human resources personnel in a corporate situation. In some instances, the recordings may be made by the police or other government authority that may verify the user's identity and administer the recordings. These recordings may be used to later authenticate a communication through a specific device.

The authentication of a user in the embodiment 100 includes two parts: one is that the user's device is the proper device and the second is that the user is the proper user. Many electronic devices have some form of unique identification number. For example, network enabled computers often have a Media Access Control ('MAC') address that is unique to various network interface cards. Personal computers may also have other unique numbers, identifiers, or addresses that can be used as unique identifiers. Cellular telephones may contain an Electronic Identification ('EID') number that is used by a service provider to uniquely identify the device.

The user's voice recordings are associated with the unique serial number or other electronic identifier of the device 114 in the database 110. When an authentication event occurs, the electronic identifier from the device 114 identifies the precise voice recording to compare with the voice recording from user 118 who is using the device 114. The server 108 performs one comparison between the prerecorded voice recording and the contemporaneous recording from the device 114 in order to authenticate the session. The server 108 performs a single comparison to determine if the contemporaneous voice recording matches the stored and authenticated voice recording. If the two recordings match, the person may be authenticated.

The authentication mechanism uses the combination of the device and user biometric feedback to authenticate. If either the device or user is incorrect, the authentication will fail. At the beginning of the authentication process, the electronic identification is transmitted to the server 108, which selects the appropriate recording to compare to the user's response. The server does not need to compare the user's response to multiple recordings.

In many embodiments, several phrases may be recorded by the voice recording mechanism 106 and stored in the database 110. In some cases, a set of predetermined phrases may be used. The phrases may include tongue twisters or words and phrases that emphasize a regional accent. In some situations, a phrase may be recorded in different cadences, such as repeating a sentence in a deliberately slow speed in stead of or in addition to the person's normal speaking cadence.

When several phrases are recorded and stored in the database 110, the server 108 may select one or more of the phrases to have the user 118 say out loud. By using a randomly selected phrase, an extra degree of security may be introduced. An eavesdropper who might record the user's 118 authentication session might be foiled when a subsequent authentication session uses a different phrase.

The voice recording mechanism 106 may be any type of recording and storage device for audio. In some embodiments, the voice of the user may be processed to create a voice stamp. In other embodiments, the user's voice may be sampled and stored in a standardized audio recording format. When the user's voice is processed and analyzed, a similar processing may be applied to the voice recording from user 118.

The server 108 may authenticate by comparing the previously recorded phrase with the spoken response from user 118 using any method possible. In some embodiments, complex audio analysis routines may be employed to painstakingly analyze any differences between the two recordings. Any type of audio comparison routine may be performed to determine a quantifiable correlation.

The tolerance or accept/reject criteria for any suitable analysis may vary from application to application, with high security applications having a very high threshold of similarity between the two recordings, and lower security applications having a lower threshold.

In some embodiments, the server 108 may prompt for two or more different phrases. For example, if a first challenge phrase does not produce an acceptable result, a different phrase may be attempted. In another example, authentication may require that the user pass two or more challenge phrases.

The database 110 may be any type of data storage system. In some cases, the database 110 may be on a hard disk or other storage device operable on the server 108. In other cases, the database 110 may be remotely located and accessible to the server 108 over a network.

The device 114 may be any type of electronic device that may communicate over a network 112 to the server 108. For example, the device 114 may be a personal computer with an attached microphone 116. The device 114 may be a cellular telephone or a voice-over-IP ('VoIP') phone that communicates on a cellular network or the internet, respectively. In some cases, the device 114 may be a wireless device, personal digital assistant ('PDA') or any other network connected appliance.

The network 112 may be any communications network appropriate to allow a device 114 to communicate with the server 108. In some cases, multiple types of networks may be used. For example, a device 114 that is a cellular telephone may use a cellular radio network that connects to the internet to connect to the server 108.

Figure 2:
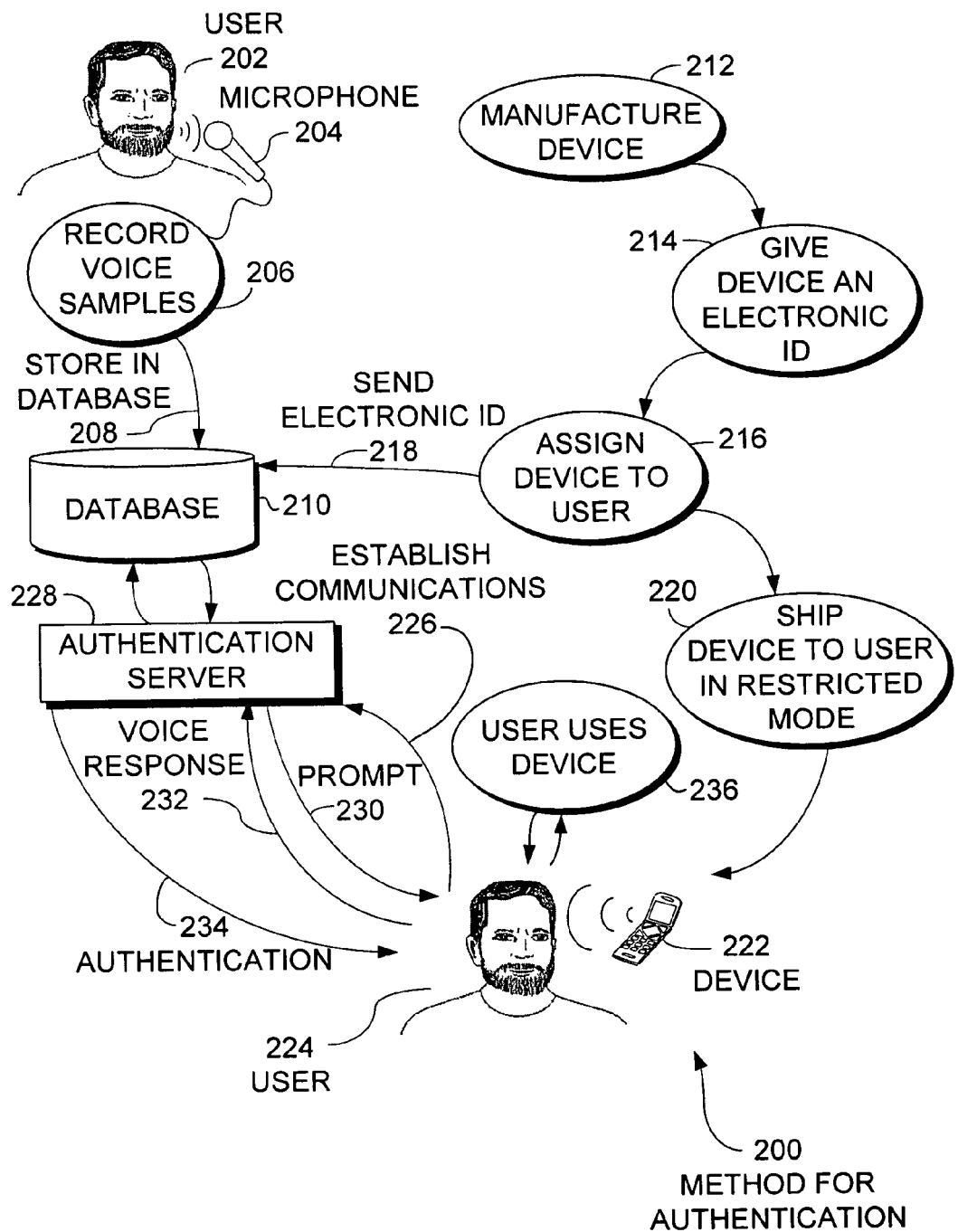
FIG. 2 is a diagrammatic illustration of an embodiment showing a method for voice authentication.

FIG. 2 is an illustration of an embodiment 200 showing a method for authentication for the first use of a device. A user 202 uses a microphone 204 to record voice samples in block 206. The voice samples are stored 208 in the database 210. When a device is manufactured in block 212, it may be given an electronic identification in block 214. The device may be assigned to the user in block 216 and the electronic identification is sent 218 to the database 210. The device may be shipped to the user in a restricted mode in block 220. When the user 224 receives the device 222, communications may be established 226 with the server 228. The server 228 may provide a prompt 230 for the user 224 to speak into a microphone in the device 222. The voice response 232 may be transmitted back to the authentication server 228. If the voice of user 224 matches the voice of user 204, the two users may be considered to be the same people. In such a case, an authentication may be transmitted 234 to the device 222, which may begin normal operation. In a normal operating mode, such as when the user uses the device 236, the authentication server 228 may occasionally prompt for the user 224 to perform voice authentication.

The embodiment 200 illustrates how a device that is delivered to a user may be authenticated prior to use. A voice recording of the user is made when the user's identity may be verified by a store clerk, an agent of a government or business, or any other person empowered to verify a person's identity. A device that may or may not be present at the time can be associated with the user, so that the user and only the user may operate the device.

The embodiment 200 shows authentication of a device that may be assigned to a user after the user's voice is recorded and stored in the database 210. In a corporate setting, when a new computer, telephone, or other device is assigned to an employee, the employee may be able to authenticate himself or herself using the voice authentication system and activate the new device. The authentication system provides a security measure that ensures the proper device is associated with the proper user. If the device was misappropriated by someone else, the device could not be authenticated.

In some embodiments, the device may be shipped to the user in a crippled mode or restricted mode. Such a mode may limit the user's ability to operate the device, but may enable communications sufficient to perform the authentication routine. The crippled mode or restricted mode may be a feature within the phone itself that disables specific functionality. In such a case, the result of the authentication routine may be a code that unlocks the functionality and makes it available to the user.

In other embodiments, the network or a server on the network to which the device is attached may provide a limited suite of services or communications to the device. For example, when a telephony device initially connects to the network, be it a cellular telephone, VoIP device, or conventional terrestrial telephone, the services provided for the device may be restricted to the communication with the authentication server 228. Once the device is properly authenticated, the server or network may permit full functionality to the device.

During normal use 236, the authentication server 228 may require that the user 224 periodically authenticate himself or herself to the system. For example, if a device contains sensitive data or provides a costly service, the user may be required to periodically authenticate in order continue using the device 222. One such example may be a cellular telephone that is authenticated by the user 224 at least once a day to ensure that only the proper authorized user is operating the device. In another example, the device 222 may contain sensitive data, such as customer lists or secret military information. The user may be required to authenticate on a random or specified period of time, otherwise the device 222 may erase such information before it gets into the wrong hands. In such cases, the prompt 230 may be an occasional prompt, triggered by the mere elapse of time or by a change in the status or function of the device 222.

Figure 3:
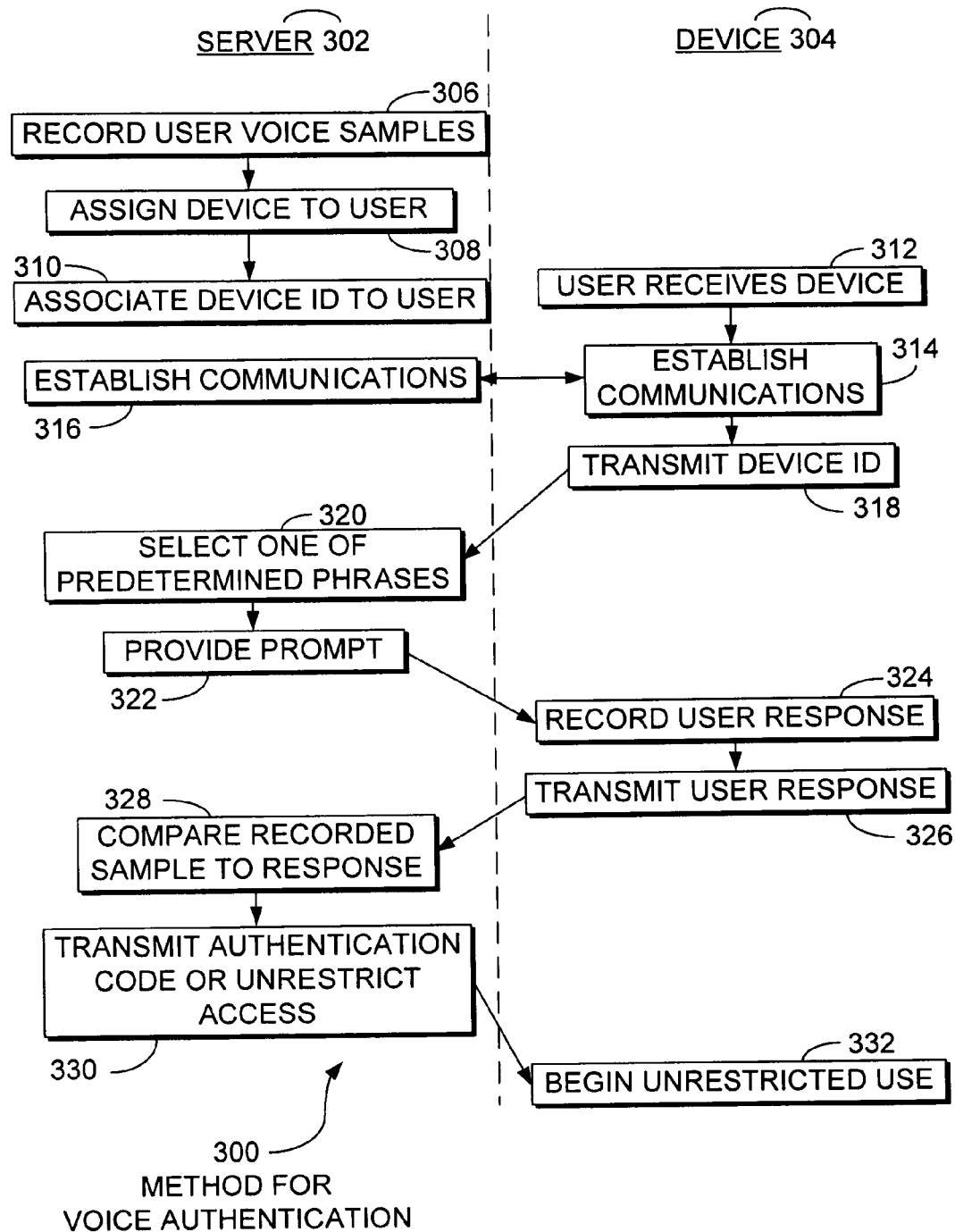
FIG. 3 is a timeline illustration of an embodiment showing a method for voice authentication.

FIG. 3 is a timeline illustration of an embodiment 300 of the communications between a server 302 and a device 304. The server 302 may record user voice samples in block 306. When a device is assigned to a user in block 308, the electronic identification of the device is associated with the user in block 310.

The user receives the device in block 312. Communication is established between the device 304 and the server 302 in blocks 314 and 316. The device identifier is transmitted from the device 304 to the server 302 in block 318. The server 302 may select one of a plurality of predetermined phrases in block 320 and provide a prompt in block 322 to the device 304. The user of the device 302 may record a user response in block 324 and transmit the user response in block 326 to the server 302. The prerecorded sample is compared to the user response in block 328. Providing that the prerecorded sample and the user response of block 328 are authenticated, an authentication code is transmitted in block 330 to the device 302, which may begin unrestricted use in block 332.

The embodiment 300 illustrates the basic communication between a server 302 and a device 304 that use voice authentication. The electronic identification embedded or included in the device is used to select a user's prerecorded voice sample to compare to a contemporaneous sample placed through the device. Using this method, both the device and the user are authenticated together.

The embodiment 300 may be used for authenticating the device 304 at the first use of the device. In such a case, subsequent authentication may or may not be necessary. In another use of the embodiment 300, authentication may be performed prior to an event where security or authentication is required. For example, authentication may be used in conjunction with a commercial transaction.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:

storing, by an authentication server, a plurality of prerecorded voice samples for authenticating a user, the prerecorded voice samples comprising predetermined phrases spoken by the user, each predetermined phrase being recorded at a plurality of cadences different from a speaking cadence of the user;

associating, by the authentication server, the user with an electronic identifier of a device provided to the user in a restricted operating mode;

receiving, by the authentication server, a request for authentication transmitted by the device;

receiving, by the authentication server, the electronic identifier of the device;

randomly selecting, by the authentication server, one of the prerecorded voice samples as a challenge phrase;

prompting, by the authentication server, the user to speak the challenge phrase into a microphone of the device;

recording, by the authentication server, a voice response spoken by the user into the microphone; and authenticating, by the authentication server, the user for enabling use of the device in an unrestricted operating mode based on a comparison of the voice response and the prerecorded voice sample that was selected as the challenge phrase.

2. The method of claim 1 wherein the device is a telephony device.

3. The method of claim 1 wherein the restricted operating mode disables specific functionality of the device.

4. The method of claim 1 wherein the restricted operating mode restricts services provided for the device.

5. The method of claim 1 wherein the predetermined phrases comprise one or more phrases that emphasize a regional accent.

6. The method of claim 1 wherein the predetermined phrases comprise one or more tongue twisters.

7. A server comprising:
- a database of prerecorded voice samples for authenticating a user, the prerecorded voice samples comprising predetermined phrases spoken by the user, each predetermined phrase being recorded at a plurality of cadences different from a speaking cadence of the user; and
- a controller adapted to:
  - associate the user with an electronic identifier of a device provided to the user in a restricted operating mode;
  - receive a request for authentication transmitted by the device;
  - receive the electronic identifier of the device;
  - randomly select one of the prerecorded voice samples as a challenge phrase;
  - prompt the user to speak the challenge phrase into a microphone of the device;
  - record a voice response spoken by the user into the microphone; and
  - authenticate the user for enabling use of the device in an unrestricted operating mode based on a comparison of the voice response and the prerecorded voice sample that was selected as the challenge phrase.

8. The server of claim 7 wherein the device is a telephony device.

9. The server of claim 8 wherein the device is a voice over internet protocol telephone.

10. The server of claim 8 wherein the device is a cellular telephone.

11. The server of claim 7 wherein the restricted operating mode disables specific functionality of the device.

12. The server of claim 7 wherein the restricted operating mode restricts services provided for the device.

13. The server of claim 7 wherein the predetermined phrases comprise one or more phrases that emphasize a regional accent.

14. The server of claim 7 wherein the predetermined phrases comprise one or more tongue twisters.

15. A computer-readable memory storing computer-executable instructions that, when executed by a computer, cause the computer to perform a method comprising:
- storing a plurality of prerecorded voice samples for authenticating a user, the prerecorded voice samples comprising predetermined phrases spoken by the user, each predetermined phrase being recorded at a plurality of cadences different from a speaking cadence of the user;
- associating the user with an electronic identifier of a device provided to the user in a restricted operating mode;
- receiving a request for authentication transmitted by the device;
- receiving the electronic identifier of the device;
- randomly selecting one of the prerecorded voice samples as a challenge phrase;
- prompting the user to speak the challenge phrase into a microphone of the device;
- recording a voice response spoken by the user into the microphone; and
- authenticating the user for enabling use of the device in an unrestricted mode based on a comparison of the voice response and the prerecorded voice sample that was selected as the challenge phrase.

16. The computer-readable memory of claim 15 wherein the device is a telephony device.

17. The computer-readable memory of claim 15 wherein the restricted operating mode disables specific functionality of the device.

18. The computer-readable memory of claim 15 wherein the restricted operating mode restricts services provided for the device.

19. The computer-readable memory of claim 15 wherein the predetermined phrases comprise one or more phrases that emphasize a regional accent.

20. The computer-readable memory of claim 15 wherein the predetermined phrases comprise one or more tongue twisters.

* * * * *